UNITED STATES PATENT OFFICE.

WILLIAM B. TRUFANT, OF BATH, MAINE.

REMEDY FOR SALT-RHEUM, &c.

Specification forming part of Letters Patent No. 597, dated February 10, 1838.

*To all whom it may concern:*

Be it known that I, WILLIAM B. TRUFANT, of Bath, in the county of Lincoln and State of Maine, have invented a new Composition of Matter as a Remedy for Salt-Rheum and other Humors of a similar character, consisting of a mixture to be taken internally, and an ointment to be applied externally at the same time, of which a full and exact description of the composition, mode of preparing and using is as follows, viz:

The mixture for inward application is composed of the inner part of the black cherry, yellow birch, white ash, and white poplar, or aspen trees, and of the black alder and coffee, hazel shrubs or bushes, all ground about as fine as coarsely-ground coffee, so as to be convenient for steeping, to be used when dried sufficiently for grinding; also, the leaves and stock of the lignum-pinæ plant dried and pulverized about as fine as the barks, and the wood of lignum-vitæ tree scraped or rasped as fine as common sawdust, and common blue clay. These may be used in equal quantities, but I prefer less—say one-half as much—of each of the four last-named articles as of each of the others. When mixed together it must be steeped in water at the rate of one ounce of the mixture to two-thirds of a pint of water, the steeping to be performed by pouring on the water in a boiling state, and after keeping it on at nearly boiling-heat for about ten minutes, pouring it off to cool for the use of the liquor. I do not, however, prepare the liquor for sale, inasmuch as it will sour in warm weather, generally in a week; and therefore no more should be steeped in summer than may be used in four or five days, as it is worthless when sour. I intend to offer the mixture for sale, ready for steeping, with directions. The liquor thus prepared is to be taken night and morning until a cure is effected, which will ordinarily be from one to three months, according to nature of the case. An adult patient may commence with about one wine-glassful for a dose, increasing to double that quantity in two or three days. It should be taken before breakfast and shortly before going to bed, while the stomach has not much food in it.

Children should take in proportion to age and strength, although some excess would not be dangerous; and if the patient be a nursing-child it is better that the person affording the nourishment should take a half-dose, while the child may take less in proportion.

The liquor may be sweetened with molasses, if preferred by the patient.

The ointment consists of fresh butter, (for which lard may be substituted if butter cannot conveniently be had,) tar, rosin, spirits of turpentine, red precipitate, and a sirup made of about the consistency of thin molasses, from the bruised or ground root of the lignum-pinæ plant in the proportion of half a pound of butter, half an ounce of the precipitate, two ounces of tar, two ounces of rosin, one gill of spirits of turpentine, and a table-spoonful of the sirup. These should be simmered together until, when cool, they form an ointment of about the consistency of butter. This ointment is to be used by rubbing it with the hand on the parts affected until the pores of the skin are well filled with it, at night only, after taking the liquid of the mixture inwardly, beginning its use only after having taken the other five or six times and continuing it until a cure is effected.

When the lignum-pinæ plant cannot be obtained the mixture and ointment are useful without it, although less efficacious.

What I claim as my invention, and desire to secure by Letters Patent, is—

The composition of matter consisting of the mixture and ointment containing the several articles aforesaid, to be used as before described, as a remedy for the salt-rheum and other similar humors or complaints.

WILLIAM B. TRUFANT.

Witnesses:
BENJA. RANDALL,
JACOB S. SEWALLS.